(12) United States Patent
Wang et al.

(10) Patent No.: US 11,743,895 B2
(45) Date of Patent: Aug. 29, 2023

(54) AGGREGATION FOR SIDELINK COMMUNICATION

(71) Applicant: QUALCOMM Incorporated, San Diego, CA (US)

(72) Inventors: Xiaojie Wang, Hillsborough, NJ (US); Piyush Gupta, Bridgewater, NJ (US); Jing Sun, San Diego, CA (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 17/305,216

(22) Filed: Jul. 1, 2021

(65) Prior Publication Data
US 2022/0022178 A1 Jan. 20, 2022

Related U.S. Application Data

(60) Provisional application No. 62/705,789, filed on Jul. 15, 2020.

(51) Int. Cl.
*H04W 72/20* (2023.01)

(52) U.S. Cl.
CPC .................................. *H04W 72/20* (2023.01)

(58) Field of Classification Search
CPC ...................................................... H04W 72/20
See application file for complete search history.

(56) References Cited

U.S. PATENT DOCUMENTS

| 11,039,426 B2 * | 6/2021 | Baghel | .................. H04W 72/20 |
| 2022/0312385 A1 * | 9/2022 | Sun | ........................ H04W 72/02 |

* cited by examiner

*Primary Examiner* — Duc C Ho
(74) *Attorney, Agent, or Firm* — Harrity & Harrity, LLP

(57) ABSTRACT

Various aspects of the present disclosure generally relate to wireless communication. In some aspects, a user equipment (UE) may perform blind decoding, for sidelink control information (SCI) in resources in one or more sub-channels of a sidelink resource pool, based at least in part on an aggregation level or a resource aggregation configuration. The UE may receive the SCI based at least in part on performing the blind decoding for the SCI. Numerous other aspects are described.

30 Claims, 13 Drawing Sheets

AGGREGATION FOR SIDELINK COMMUNICATION

CROSS-REFERENCE TO RELATED APPLICATION

This Patent Application claims priority to U.S. Provisional Patent Application No. 62/705,789, filed on Jul. 15, 2020, entitled "AGGREGATION FOR SIDELINK COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for aggregation for sidelink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: mapping sidelink control information (SCI) to resources, in one or more sub-channels of a sidelink resource pool, based at least in part on an aggregation level or a resource aggregation configuration; and transmitting the SCI in the resources.

In some aspects, a method of wireless communication performed by a UE includes: performing blind decoding, for SCI in resources in one or more sub-channels of a sidelink resource pool, based at least in part on an aggregation level or a resource aggregation configuration; and receiving the SCI based at least in part on performing the blind decoding for the SCI.

In some aspects, a UE for wireless communication includes: a memory, and one or more processors, coupled to the memory, configured to: map SCI to resources, in one or more sub-channels of a sidelink resource pool, based at least in part on an aggregation level or a resource aggregation configuration; and transmit the SCI in the resources.

In some aspects, a UE for wireless communication includes: a memory, and one or more processors, coupled to the memory, configured to: perform blind decoding, for SCI in resources in one or more sub-channels of a sidelink resource pool, based at least in part on an aggregation level or a resource aggregation configuration; and receive the SCI based at least in part on performing the blind decoding for the SCI.

In some aspects, a non-transitory computer-readable medium storing a set of instructions for wireless communication includes: one or more instructions that, when executed by one or more processors of a UE, cause the UE to: map SCI to resources, in one or more sub-channels of a sidelink resource pool, based at least in part on an aggregation level or a resource aggregation configuration; and transmit the SCI in the resources.

In some aspects, a non-transitory computer-readable medium storing a set of instructions for wireless communication includes: one or more instructions that, when executed by one or more processors of a UE, cause the UE to: perform blind decoding, for SCI in resources in one or more sub-channels of a sidelink resource pool, based at least in part on an aggregation level or a resource aggregation configuration; and receive the SCI based at least in part on performing the blind decoding for the SCI.

In some aspects, an apparatus for wireless communication includes: means for mapping SCI to resources, in one or more sub-channels of a sidelink resource pool, based at least in part on an aggregation level or a resource aggregation configuration; and means for transmitting the SCI in the resources.

In some aspects, an apparatus for wireless communication includes: means for performing blind decoding, for SCI in resources in one or more sub-channels of a sidelink resource pool, based at least in part on an aggregation level or a resource aggregation configuration; and means for receiving the SCI based at least in part on performing the blind decoding for the SCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
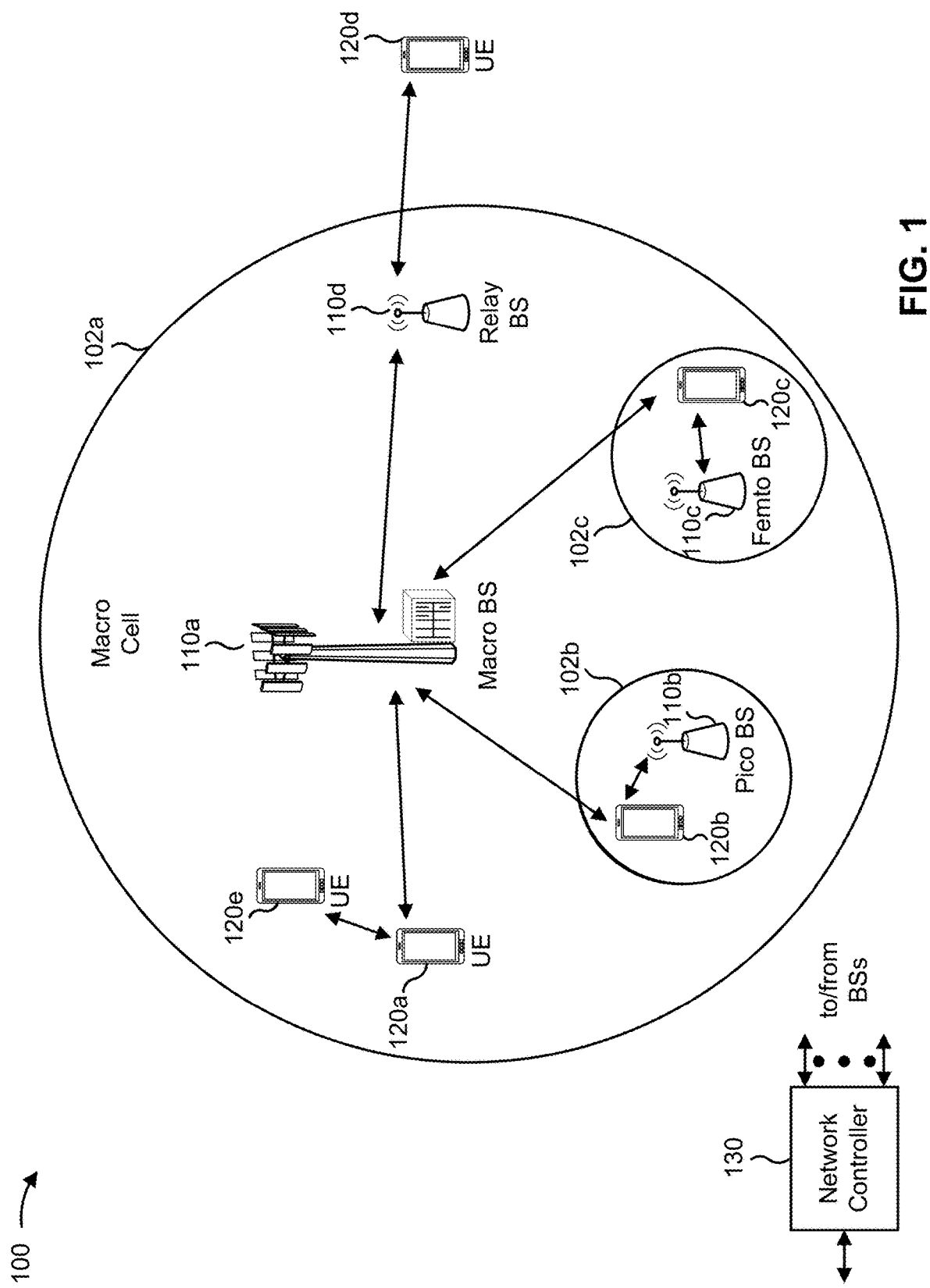
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
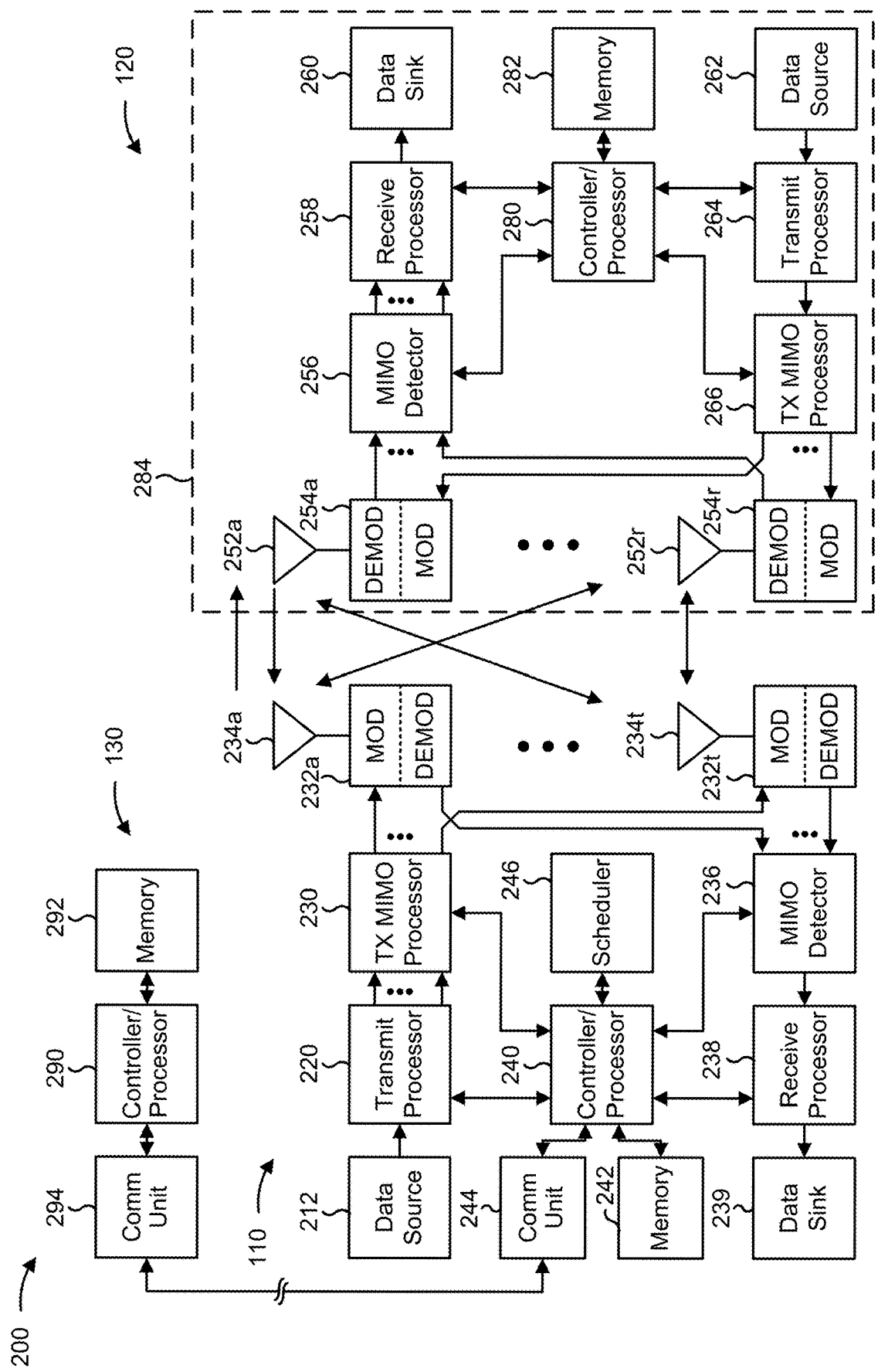
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7A-7E, 8, and 9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7A-7E, 8, and 9).

Controller/processor 240 of base station 110, controller/processor 280 of UE 120, and/or any other component(s) of FIG. 2 may perform one or more techniques associated with aggregation for sidelink communication, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 may include means for determining resources, in one or more sub-channels of a sidelink resource pool that are to be used to transmit SCI, based at least in part on an aggregation level or a resource aggregation configuration, means for mapping SCI to resources, in one or more sub-channels of a sidelink resource pool, based at least in part on an aggregation level or a resource aggregation configuration, means for transmitting the SCI in the resources, and/or the like. In some aspects, UE 120 may include means for performing blind decoding, for SCI in resources in one or more sub-channels of a sidelink resource pool, based at least in part on an aggregation level or a resource aggregation configuration, means for receiving the SCI based at least in part on performing the blind decoding for the SCI, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
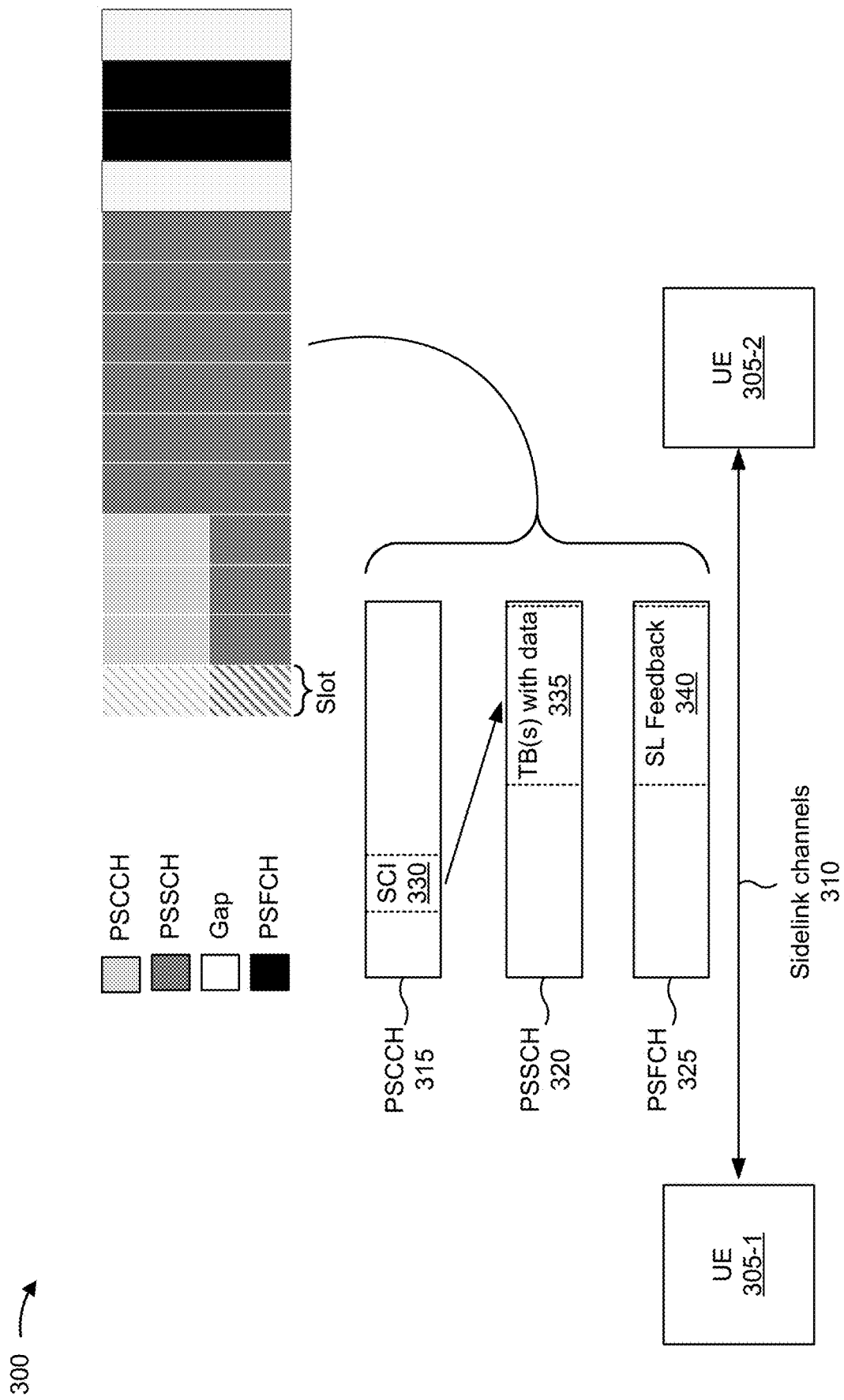
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-pedestrian (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

The PSCCH 315 may be configured (e.g., statically or semi-statically) to occupy a particular quantity of physical RBs (PRBs), such as 10, 12, 15, 20, 25, and/or the like, PRBs. The PSCCH 315 may be confined to a single sub-channel, and may have a duration of two or three symbols (e.g., according to a static configuration or a semi-static configuration). A sub-channel may occupy a particular quantity of PRBs, such as 10, 15, 20, 25, 50, 75, 100, and/or the like, PRBs. Accordingly, a resource pool may include a particular quantity of sub-channels (e.g., according to a configured sub-channel size), such as from 1-27 sub-channels. Moreover, the PSCCH 315 may be configured with a fixed size for a resource pool, and the fixed size may be 10% to 100% of the size of a sub-channel in the frequency domain. The PSSCH 320 may occupy one or more subchannels, and may carry second-stage SCI, as described below.

In some aspects, a UE 305 may operate using a transmission mode where resource selection and/or scheduling is performed by the UE 305 (e.g., rather than a base station 110). Resource selection and/or scheduling performed by a base station 110 may be referred to as mode 1, and resource selection and/or scheduling performed by a UE 305 may be referred to as mode 2, as described below. In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
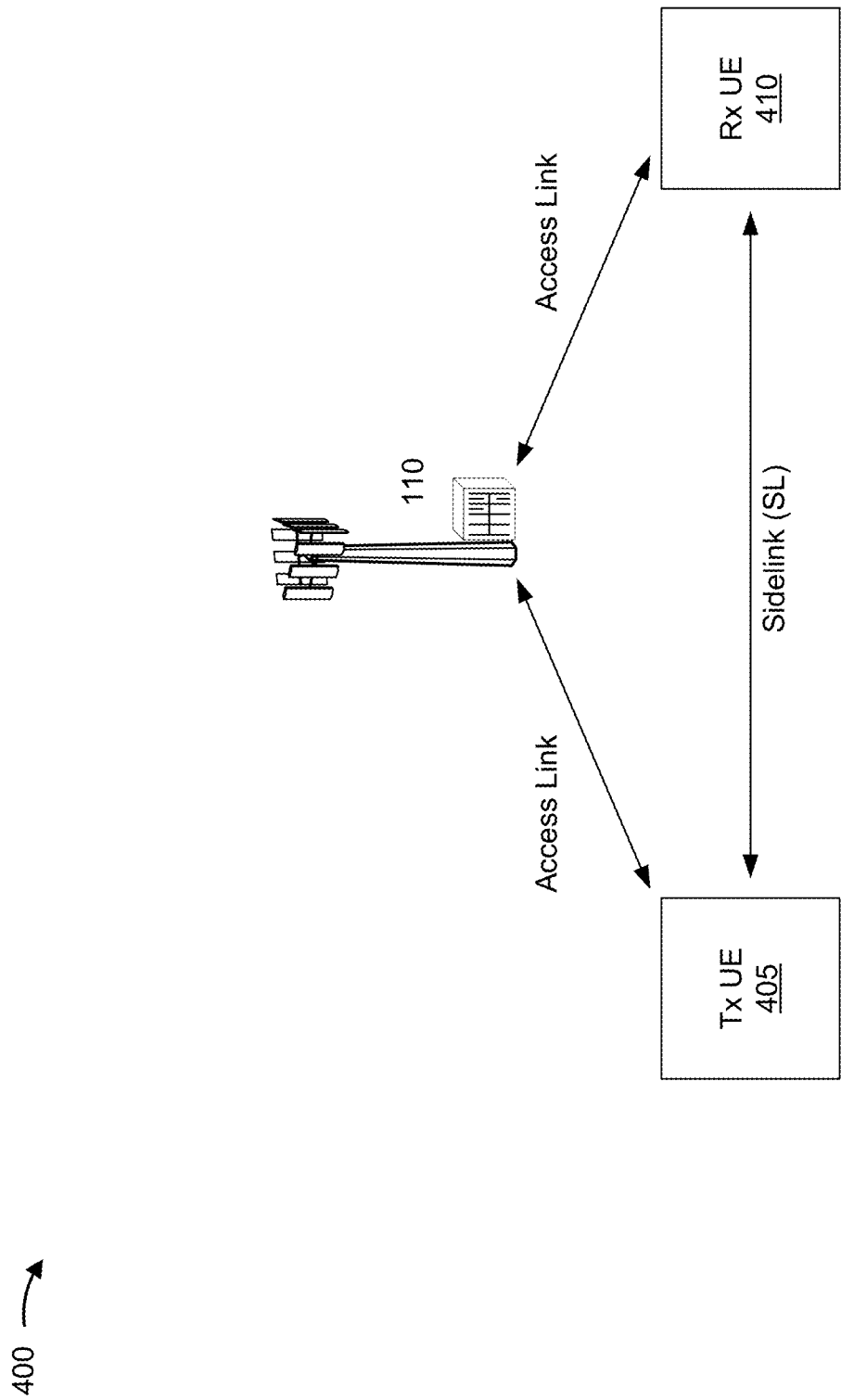
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a direct link between UEs 120 (e.g., via a PC5 interface) may be referred to as a sidelink, and a direct link between base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As described above, the UEs 405 may operate in mode 1, in which resource selection and/or scheduling is performed by the base station 110. That is, in mode 1, the base station 110 assigns resources for transmitting sidelink communications. In particular, the base station 110 may transmit downlink control information (DCI) (e.g., in DCI format 3_0) that indicates a resource allocation (e.g., time and/or frequency resources) and/or a transmission timing. In mode 1, an MCS for sidelink transmissions may be selected by a UE 405 (e.g., within limits set by the base station 110). Moreover, mode 1 may support dynamic grants or configured grants for scheduling sidelink transmissions. The configured grants may be type 1 (e.g., which may be activated by the base station 110 via radio resource control (RRC) signaling) or type 2.

As described above, the UEs 405 may operate in mode 2, in which resource selection and/or scheduling is performed by a UE 405. That is, the transmitting UE 405 may autonomously determine resources for sidelink transmissions. In this case, the transmitting UE 405 may perform channel sensing by performing blind decoding of all PSCCH channels in order to determine resources that are reserved for sidelink transmissions (e.g., by other transmitting UEs). In this way, the transmitting UE 405 may determine available resources, which may be reported to an upper layer of the transmitting UE 405 where resource usage is determined. The receiving UE 405 operates according to the same behavior in mode 1 or mode 2.

A UE may monitor decoding candidates for a control signal. A decoding candidate may be an encoded discrete data element intended for one or more particular UEs, or for all UEs receiving the data element. Each UE receiving the encoded data element may determine whether or not the candidate is intended for the UE by attempting to decode the encoded element. If the decoding attempt by the UE is successful, the UE obtains a recognizable control signal and can infer that the UE is an intended recipient of the control signal. If the decoding attempt is not successful, the UE does not obtain a recognizable control signal from the decoding process, and the UE can infer that the UE is not an intended recipient. Because the UE attempts to decode the candidate element without first determining whether or not the UE is an intended recipient, the decoding process may be referred to as "blind decoding."

As indicated above, FIG. 4 is provided as an example. Other examples may differ from what is described with respect to FIG. 4.

Figure 5:
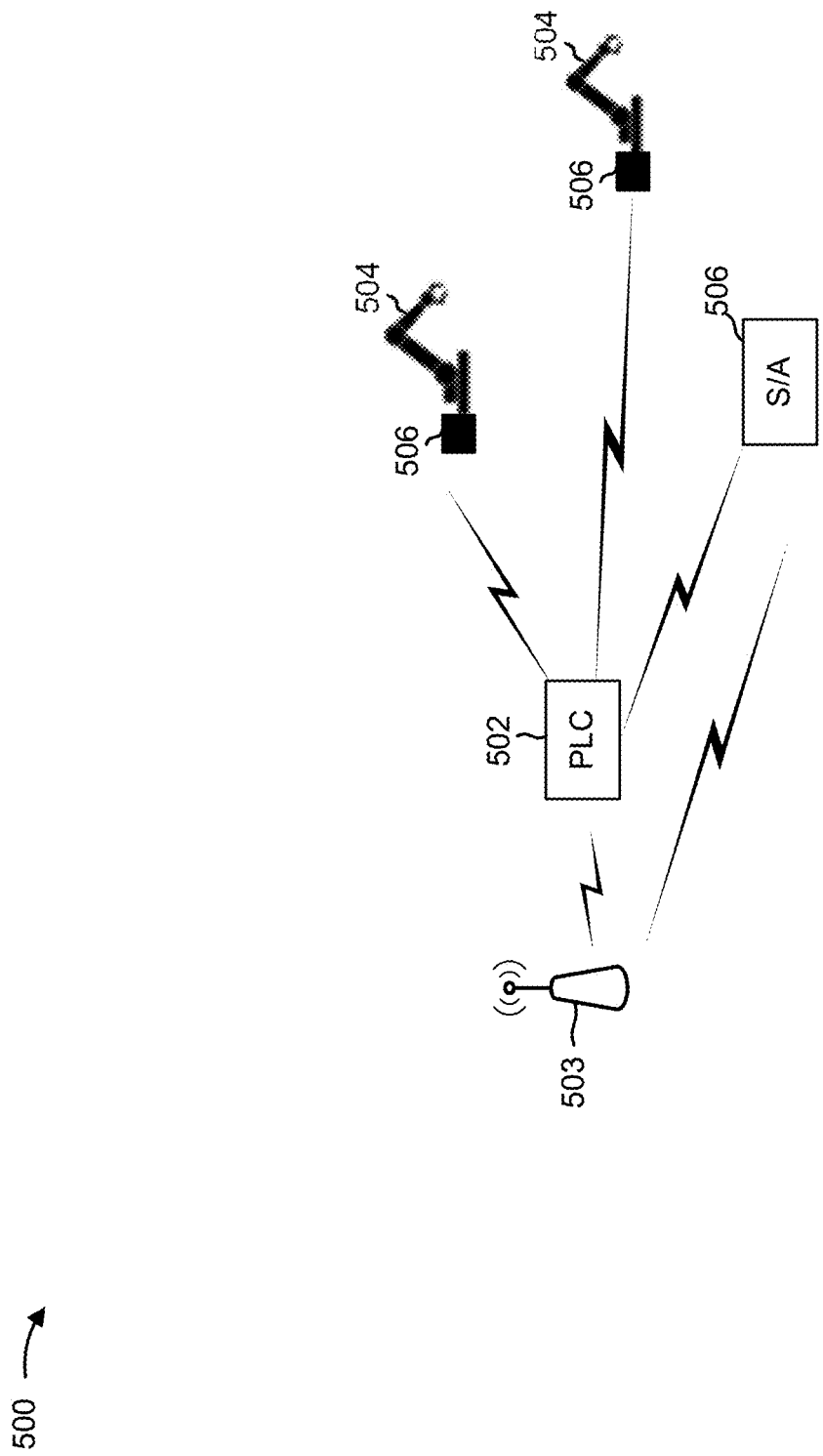
FIG. 5 is a diagram illustrating an example of a wireless communication system, in accordance with the present disclosure.

FIG. 5 is a diagram illustrating an example 500 of a wireless communication system, in accordance with the present disclosure. In some aspects, the wireless communication system may be an industrial IoT (I-IoT) communication system. I-IoT is a branch of cellular technology in which UEs and base stations are used to carry control data, measurement data, and/or the like between various industrial systems. For example, I-IoT may be used to control a sensor and/or actuator (S/A), to exchange measurement information between programmable logic controllers (PLCs), and/or the like. I-IoT presents certain challenges with regard to interference and scheduling. For example, I-IoT may be associated with a small path loss due to a waveguide effect. Furthermore, reflections in the environment (e.g., from moving components, robots, and/or the like) may cause rapidly-varying interference patterns.

In some aspects, the wireless communication system may include one or more PLCs 502, a base station 503, and one or more S/As 506. A PLC 502 and an S/A may correspond to a UE, such as UE 120, UE 305, UE 405, and/or the like. A PLC 502 and an S/A 506 may communicate directly on a sidelink or may communicate via the base station 503.

As shown in FIG. 5, a PLC 502 may exchange wireless communications with one or more S/As 506. The one or more S/As 506 may be associated with equipment 504 (e.g., factory equipment). For example, an S/A 506 may be separate from an equipment 504 (e.g., connected to the equipment 504 via a wired or wireless connection) and/or may be disposed in, or positioned at, the equipment 504. The PLC 502 may automate control of the equipment 504, machines, control systems, and/or the like, based at least in part on communications with the S/As 506.

As also shown in FIG. 5, the base station 503 may exchange communications with the PLC 502 and/or the S/As 506. For example, the base station 503 may schedule sidelink communications between the PLC 502 and the S/As 506. Additionally, or alternatively, the base station 503 may relay communications between the PLC 502 and the S/As 506.

The wireless communication system may accommodate periodic, regular traffic between the PLC 502 and the S/As 506. For example, the communications between the PLC 502 and S/A 506 (e.g., communications via a sidelink or via the base station 503) may include cyclic exchanges of information (e.g., the traffic is deterministic and periodic). I-IoT traffic typically uses small packet sizes, such as between 32 and 256 bytes. Thus, the bandwidth needed for I-IoT traffic is relatively low (e.g., as low as two resource blocks). Moreover, an S/A 506 may have reduced capability with respect to bandwidth and/or processing power. In some cases, an overall bandwidth used for I-IoT may be relatively large. For example, I-IoT may use dedicated frequency bands and/or unlicensed bands.

The communications between the PLC 502 and the S/As 506 may be associated with a low latency and a high reliability. For example, the communications may be associated with a latency of less than 2 milliseconds (ms) or less than 1 ms. The communications may have a reliability requirement on the order of $10^{-5}$ or $10^{-6}$, such as 99.9999% reliability. The latency and reliability may apply to data and control channels. Thus, a PSCCH for I-IoT communication should meet the low latency and high reliability requirements.

As indicated above, FIG. 5 is provided as an example. Other examples may differ from what is described with respect to FIG. 5.

Figure 6:
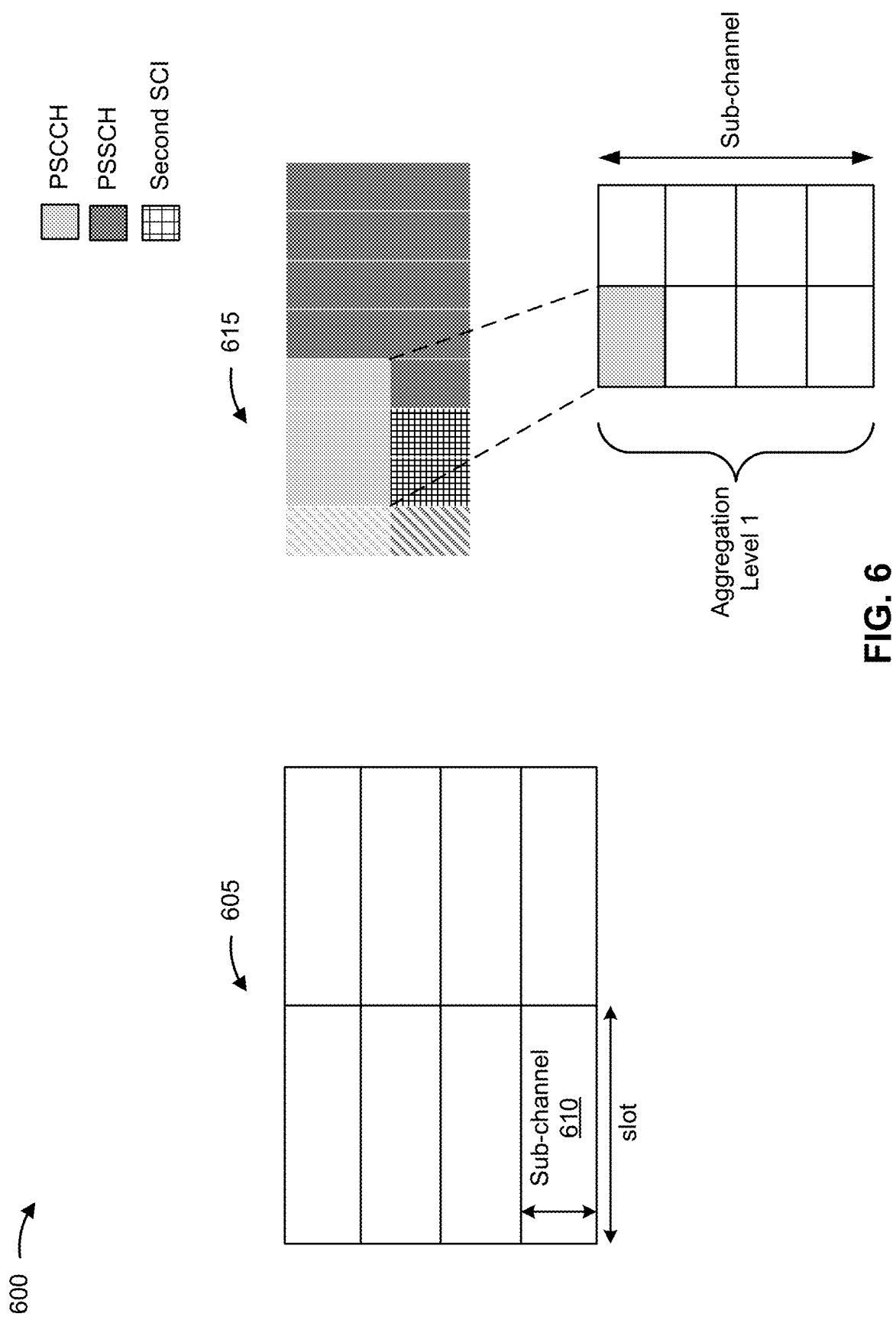
FIG. 6 is a diagram illustrating an example of blind decoding in sidelink communication, in accordance with the present disclosure.

FIG. 6 is a diagram illustrating an example 600 of blind decoding in sidelink communication, in accordance with the present disclosure.

As shown in FIG. 6, and as described above, sidelink communications may use a resource pool 605 that includes one or more sub-channels 610. Accordingly, to receive a sidelink packet, a receiving UE performs blind decoding in all sub-channels 610 of the resource pool 605. A quantity of sub-channels 610 in a resource pool 605 may be relatively small (e.g., 1-27 sub-channels, as described above), so that blind decoding all sub-channels is feasible for a UE.

As shown by reference number 615, a PSCCH and a PSSCH may be transmitted in the same slot. The PSSCH may occupy contiguous sub-channels 610 up to the total quantity of sub-channels 610 in the resource pool 605 (e.g., the PSSCH may occupy $N_{subchannel}^{SL}$). The PSCCH may occupy only one sub-channel 610 (e.g., a sub-channel 610 of the resource pool 605 associated with the lowest sub-channel index).

In some aspects, SCI may be transmitted in two stages (e.g., in two parts). First stage SCI (e.g., SCI 0_1) may be transmitted in the PSCCH. The first stage SCI may include information that indicates a bandwidth for the PSSCH, resource reservations in future slots, and/or the like. Second stage SCI (e.g., SCI 0_2) may be transmitted in the PSSCH. A UE may locate the PSSCH carrying the second stage SCI after decoding the first stage SCI in the PSCCH. The packet for the second stage SCI may indicate a source identifier and a destination identifier to indicate a UE that transmitted the packet and a UE for which the packet is intended.

A coverage of a PSCCH and/or a PSSCH may vary according to a type of service associated with the PSCCH and/or PSSCH (e.g., unicast, broadcast, and/or the like). However, in current sidelink systems, a PSCCH (e.g., for cellular V2X (C-V2X)) may have a fixed size for a resource pool. For example, the PSCCH may have a size that is based on a worst-case UE (e.g., a UE that is furthest from the transmitter, a UE associated with poor sidelink quality, and/or the like). This may waste resources, since in some scenarios, a receiver UE may be relatively close to the transmitter (e.g., in I-IoT). In some examples, as shown in FIG. 6, a PSCCH may have a fixed size that occupies only a single resource unit of a sub-channel (e.g., the PSCCH may have an aggregation level (AL) of one). Accordingly, current sidelink systems do not enable a flexible use of resources for transmitting SCI that is needed to efficiently support multiple sidelinks associated with different link qualities.

Some techniques and apparatuses described herein facilitate efficient SCI resource usage for multiple sidelinks of different link qualities. In some aspects, multiple aggregation levels (or multiple other aggregations of resources) may be used for transmitting SCI. Accordingly, some techniques and apparatuses described herein provide efficient resource allocation for SCI that uses an aggregation level, provide efficient blind decoding of a PSCCH that uses an aggregation level, and/or the like. In this way, different aggregation levels (e.g., 1, 2, 4, 8, 16, and/or the like) may be used in connection with sidelinks associated with different coverage requirements, different reliability requirements, different requirements of services (e.g., in mode 2), and/or the like. Accordingly, the techniques and apparatuses described herein conserve sidelink resources, improve the performance of sidelink communications, and/or the like.

As indicated above, FIG. 6 is provided as an example. Other examples may differ from what is described with respect to FIG. 6.

Figure 7A:
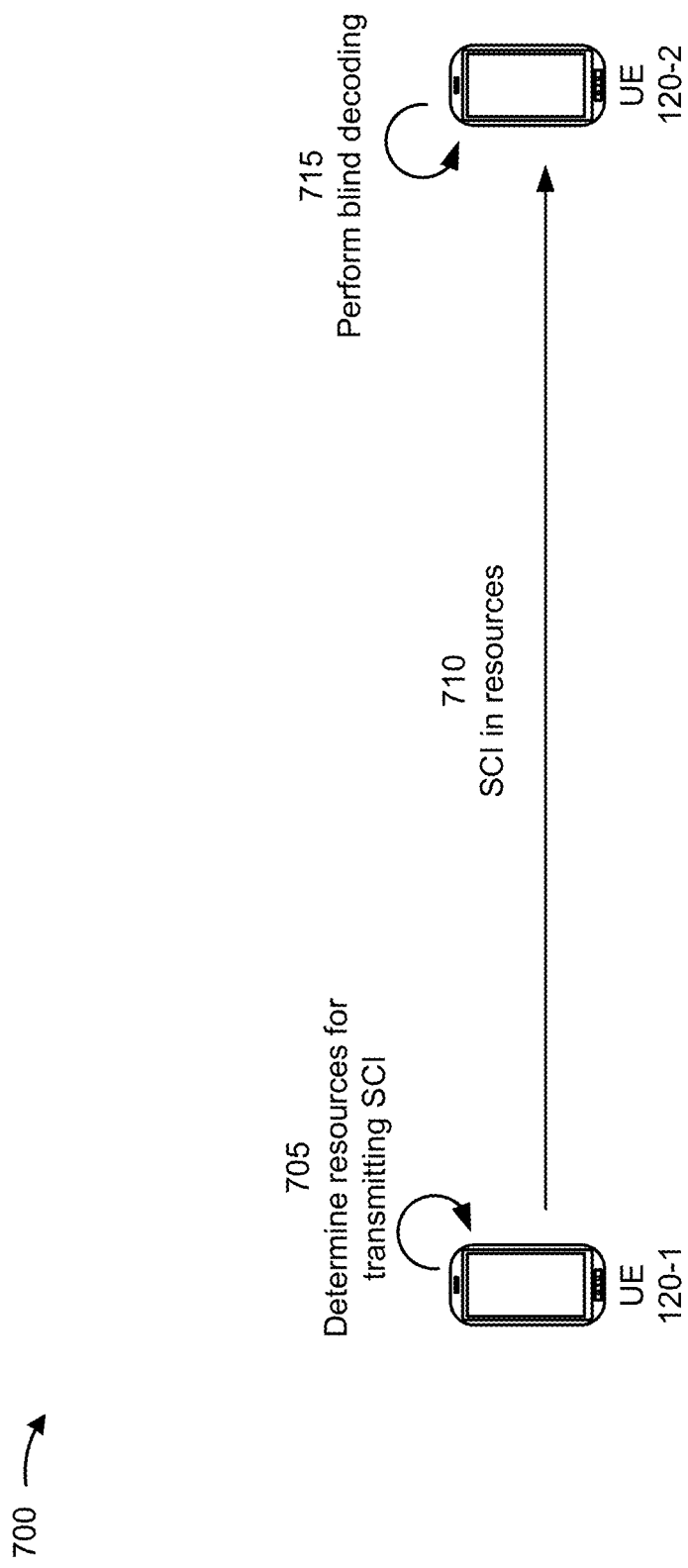
FIGS. 7A-7E are diagrams illustrating examples associated with aggregation for sidelink communication, in accordance with the present disclosure.

FIGS. 7A-7E are diagrams illustrating an example 700 associated with aggregation for sidelink communication, in accordance with the present disclosure. As shown in FIG. 7A, example 700 includes communication between a UE 120-1 and a UE 120-2. That is, the UE 120-1 and the UE 120-2 may communicate with one another on a sidelink. In an example, the UE 120-1 may transmit, and the UE 120-2 may receive, one or more communications on the sidelink. Accordingly, the UE 120-1 may be referred to as the transmitting UE 120-1, and the UE 120-2 may be referred to as the receiving UE 120-2. However, additionally, or alternatively, the UE 120-2 may transmit, and the UE 120-1 may receive, one or more communications on the sidelink. In some aspects, the UE 120-1 and/or the UE 120-2 may correspond to a UE 305, a UE 405, a PLC 502, an S/A 506, and/or the like.

In some aspects, the UE 120-1 and the UE 120-2 may communicate using sidelink mode 1 or mode 2, as described above. In mode 1, the transmitting UE 120-1 may communicate (e.g., on a wireless access link, which may include an uplink and a downlink) with a base station 110 (not shown in FIGS. 7A-7E) in connection with resource selection and/or scheduling. In some aspects, the base station 110 may correspond to a base station 503. The base station 110, the UE 120-1, and/or the UE 120-2 may be included in a wireless network, such as wireless network 100 described above in connection with FIG. 1, the wireless communication system described above in connection with FIG. 5, and/or the like.

As shown in FIG. 7A, and by reference number 705, the transmitting UE 120-1 may determine resources for transmitting SCI. The SCI may be first stage SCI that is to be transmitted in a PSCCH, or second stage SCI that is to be transmitted in a PSSCH, as described above. The resources may be in one or more sub-channels of a sidelink resource pool. The transmitting UE 120-1 may determine the resources based at least in part on an aggregation level or a resource aggregation configuration.

In some aspects, an aggregation level may indicate a quantity of resource units, of the sidelink resource pool, for transmitting the SCI. In some aspects, different aggregation levels may be used, such as 1, 4, 8, 16, and/or the like. For example, an aggregation level of two indicates that the SCI is transmitted using two resource units, an aggregation level of four indicates that the SCI is transmitted using four resource units, and so forth. A resource unit (e.g., a PSCCH unit) may refer to a PSCCH size that is configured (e.g., fixed) for the sidelink resource pool. For example, the PSCCH may be configured to occupy a particular quantity of resource blocks and to have a duration of a particular quantity of symbols.

A search space may include all possible locations (e.g., in time and/or frequency) where SCI (e.g., PSCCH) may be located. A sub-channel may include one or more search spaces. A search space may indicate a set of resource unit locations where a UE may find PSCCHs that can potentially be used to transmit control information to the UE. The possible locations for a PSCCH may depend on an aggregation level being used, and/or the like. A possible location (e.g., in time and/or frequency) for a PSCCH may be referred to as a PSCCH candidate, and the set of all possible PSCCH locations may be referred to as a search space.

In some aspects, a UE 120 may be configured (e.g., statically or semi-statically) with one or more resource aggregation configurations for the sidelink resource pool. Each resource aggregation configuration may identify different time resources (e.g., different quantities of symbols) and/or different frequency resources (e.g., different quantities of resource blocks) for transmitting SCI (e.g., each resource aggregation configuration may identify a different resource allocation for a PSCCH).

In some aspects, the transmitting UE 120-1 may determine (e.g., select) the aggregation level or the resource aggregation configuration autonomously (e.g., in mode 1 or mode 2). In some aspects, the aggregation level or the resource aggregation configuration determined by the transmitting UE 120-1 may be transparent (e.g., unknown) to the base station 110 (e.g., in mode 1). In some aspects, the transmitting UE 120-1 may determine the aggregation level or the resource aggregation configuration based at least in part on an indication received from the base station 110. For example, the indication may be in a field of DCI (e.g., in DCI format 3_0) transmitted by the base station 110, may be included (e.g., embedded) in an MCS field of DCI, may be provided by upper-layer signaling (e.g., RRC signaling), and/or the like. In some aspects, the receiving UE 120-2 may also determine the aggregation level or resource aggregation configuration based at least in part on an indication received from the base station, as described above.

In some aspects, the resources for transmitting the SCI (e.g., according to an aggregation level or a resource aggregation configuration) may be in a single sub-channel of the sidelink resource pool, as described below in FIG. 7B. In some aspects, the resources for transmitting the SCI (e.g., according to an aggregation level) may include a single resource unit repeated in multiple sub-channels of the sidelink resource pool, as described below in FIG. 7C. In some aspects, the resources for transmitting the SCI (e.g., according to an aggregation level or a resource aggregation configuration) may include one or more resources (e.g., one or more resource units) in multiple sub-channels of the sidelink resource pool, as described below in FIG. 7D.

As shown by reference number 710, the transmitting UE 120-1 may transmit the SCI in the resources that are determined. In some aspects, the transmitting UE 120-1 may map the SCI onto the resources according to the aggregation level (e.g., an aggregation level greater than one) or resource aggregation configuration (e.g., a resource aggregation configuration for more than one resource unit) that is determined. For example, the transmitting UE 120-1 may map a PSCCH or a PSSCH onto the resources according to the aggregation level or resource aggregation configuration that is determined. In some aspects, the transmitting UE 120-1 may transmit the SCI in accordance with a transmission diversity scheme. For example, the resources that are determined may be determined based at least in part on a frequency diversity scheme.

As shown by reference number 715, the receiving UE 120-2 may perform blind decoding to receive the SCI. For example, the receiving UE 120-2 may perform blind decoding of a PSCCH for first stage SCI. The receiving UE 120-2 may perform the blind decoding in resources in one or more sub-channels of the sidelink resource pool. Moreover, the receiving UE 120-2 may perform the blind decoding (e.g., including channel estimation) based at least in part on an aggregation level or resource aggregation configuration. In some aspects, as described in more detail below, the receiving UE 120-2 may blindly decode a PSCCH using each aggregation level or each resource aggregation configuration (e.g., each aggregation level or resource aggregation configuration that is configured for the receiving UE 120-2). In some aspects, as described in more detail below, the receiving UE 120-2 may blindly decode a PSCCH in a search space configured for the PSCCH.

Figure 7B:
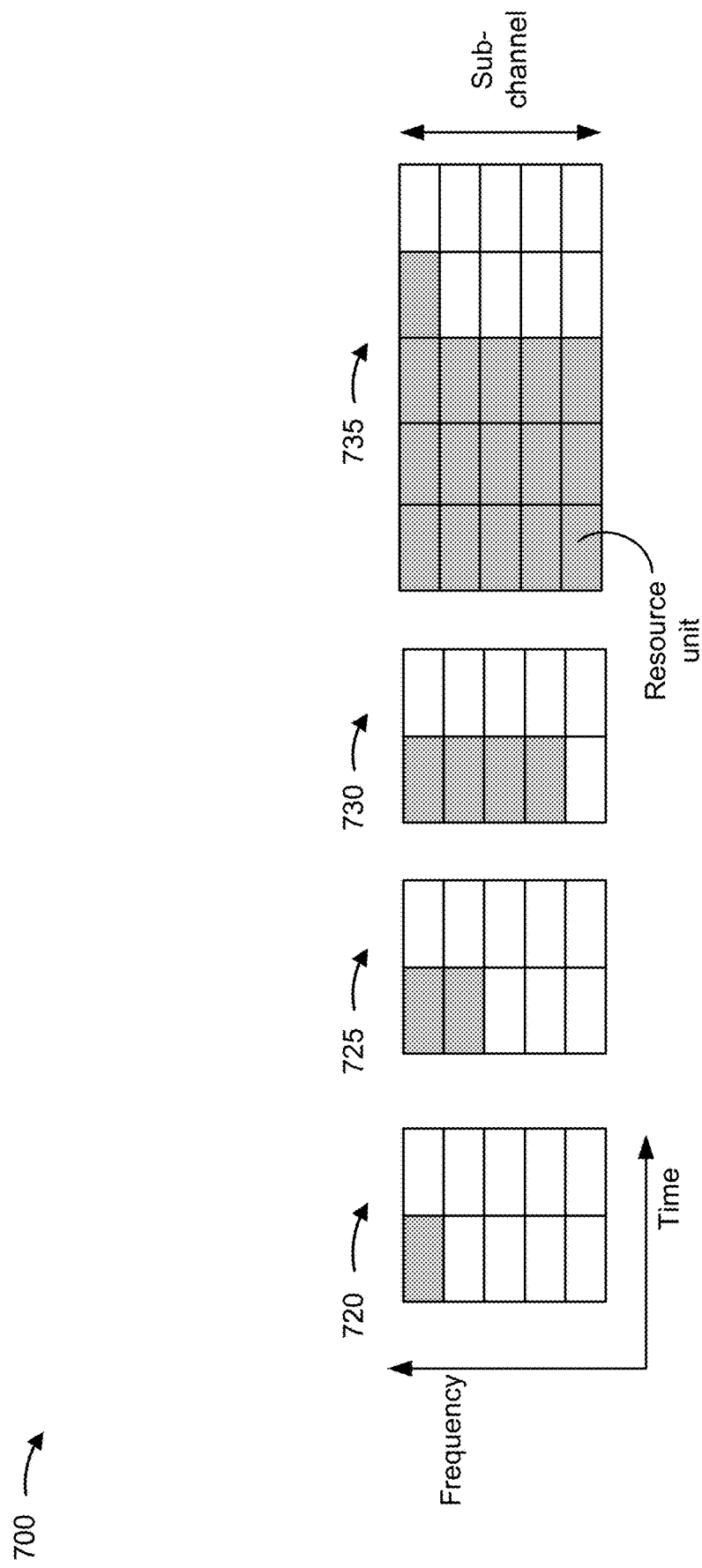

FIG. 7B shows examples of resource aggregation in a single sub-channel of the sidelink resource pool. As shown in FIG. 7B, the resources for transmitting a PSCCH (e.g., carrying first stage SCI) are within a single sub-channel. In this case, the transmitting UE 120-1 may first map the PSCCH to the resources of the single sub-channel, and then map a PSSCH to the remaining resources of the single sub-channel.

In some aspects, the transmitting UE 120-1 may map the PSCCH to the resources according to an aggregation level pattern. An aggregation level pattern may be configured (e.g., statically or semi-statically) for a UE 120. An aggregation level pattern may be based at least in part on a sidelink resource pool configuration, such as a PSCCH configuration (e.g., which may indicate a resource unit size) and/or a sub-channel configuration (e.g., which may indicate a sub-channel size) associated with the sidelink resource pool. In some aspects, an aggregation level pattern may indicate that a PSCCH is to be mapped to resources of the single sub-channel first in a frequency domain and then in a time domain.

As shown by example 720, if an aggregation level used for transmitting the PSCCH is one, then the PSCCH may be transmitted in one resource unit of the single sub-channel. As shown by example 725, if an aggregation level used for transmitting the PSCCH is two, then the PSCCH may be transmitted in two resource units of the single sub-channel. As shown by example 730, if an aggregation level used for transmitting the PSCCH is four, then the PSCCH may be transmitted in four resource units of the single sub-channel. As shown by example 735, if an aggregation level used for transmitting the PSCCH is sixteen, then the PSCCH may be transmitted in sixteen resource units of the single sub-channel (e.g., first in a frequency domain and then in a time domain).

As described above, the transmitting UE 120-1 may use a resource aggregation configuration for transmitting a PSCCH as an alternative to an aggregation level. As described above, a resource aggregation configuration may indicate frequency resources and time resources for transmitting a PSCCH. For example, a first resource aggregation configuration may indicate that four resource blocks and two symbols are to be used for transmitting a PSCCH, a second resource aggregation configuration may indicate that eight resource blocks and two symbols are to be used for transmitting a PSCCH, and so forth. As an example, the resources used for transmitting a PSCCH in example 725 may correspond to a particular resource aggregation configuration, the resources used for transmitting a PSCCH in example 730 may correspond to another particular resource aggregation configuration, and so forth.

In some aspects, a resource aggregation configuration may indicate a quantity of resource units (e.g., PSCCH units) and a quantity of symbols for transmitting a PSCCH. In some aspects, a resource aggregation configuration may not use an integer multiple of the resource unit to indicate frequency resources for transmitting SCI. For example, a resource aggregation configuration may indicate a quantity of resource blocks (e.g., which may correspond to 1.5 resource units, 2.25 resource units, and/or the like) and a quantity of symbols for transmitting a PSCCH. In this way, a resource aggregation configuration scheme may permit greater flexibility than an aggregation level scheme.

In some aspects, the transmitting UE 120-1 may map the PSCCH to resources in the single sub-channel according to an aggregation level or resource aggregation configuration (and according to an aggregation level pattern). In some aspects, the receiving UE 120-2 may perform blind decoding (e.g., including channel estimation) for the PSCCH according to each aggregation level or resource aggregation configuration (e.g., each aggregation level or resource aggregation configuration that is configured for the receiving UE 120-2) in each sub-channel of the sidelink resource pool. For example, in a first sub-channel of the sidelink resource pool, the receiving UE 120-2 may perform blind decoding using aggregation levels 1, 2, 4, and 16; in a second sub-channel of the sidelink resource pool, the receiving UE 120-2 may perform blind decoding using aggregation levels 1, 2, 4, and 16; and so forth.

In some aspects, the receiving UE 120-2 may perform blind decoding for the PSCCH within a search space. In this case, respective search spaces may be defined for the sub-channels of the sidelink resource pool. In some aspects, a search space may indicate one or more aggregation levels or resource aggregation configurations that are to be used for blind decoding in a sub-channel. For example, a first search space for a first sub-channel of the sidelink resource pool may indicate that blind decoding is to be performed for aggregation levels 1, 2, and 4; a second search space for a second sub-channel of the sidelink resource pool may indicate that blind decoding is to be performed only for aggregation level 1; and so forth.

In some cases, a quantity of channel estimation procedures performed by the receiving UE 120-2 may be based at least in part on an aggregation level pattern that is used for transmitting the PSCCH. Accordingly, using resources in a single sub-channel for transmitting PSCCH may be suitable when the PSCCH and/or the PSSCH are relatively small. For example, in some cases, the PSCCH may be 10% or less of the size of a sub-channel in the frequency domain (e.g., the PSCCH is 10 resource blocks and two symbols, and the sub-channel is 100 resource blocks) and/or the PSSCH may be confined to one sub-channel.

Figure 7C:
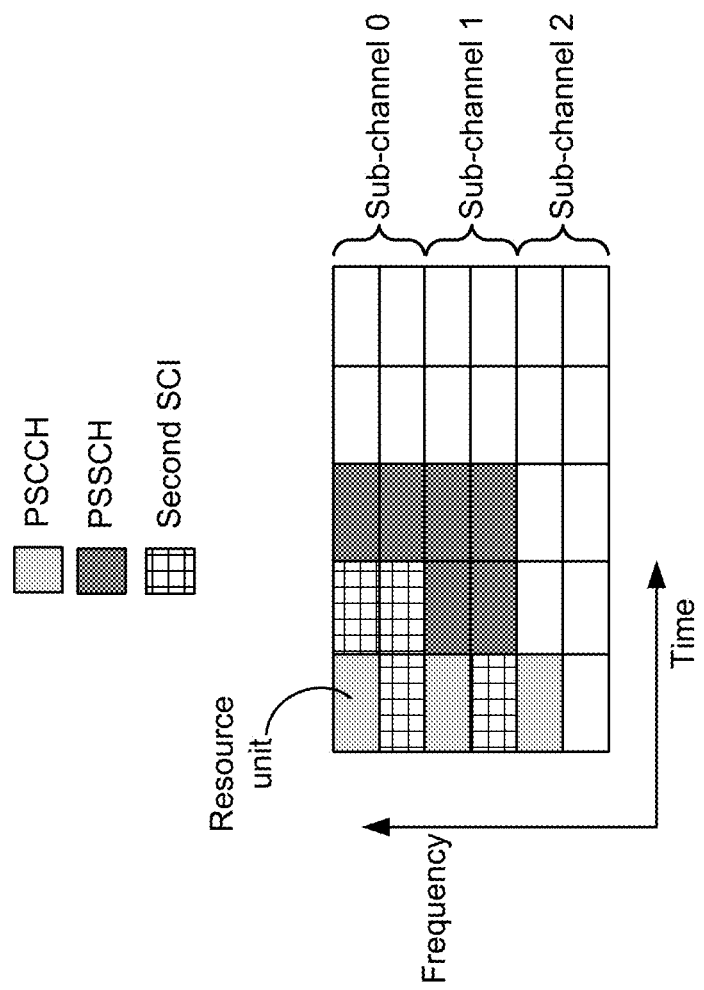

FIG. 7C shows an example of resource aggregation across sub-channels of the sidelink resource pool. As shown in FIG. 7B, the resources for transmitting a PSCCH (e.g., carrying first stage SCI) are in multiple sub-channels of the sidelink resource pool.

In this case, the resources for transmitting the PSCCH may include a single resource unit that is repeated in the multiple sub-channels. In some aspects, the single resource unit that is repeated in the multiple sub-channels may have the same resource location (e.g., the same time and frequency location, relative to a starting frequency of a sub-channel)) in the multiple sub-channels. For example, as shown in FIG. 7C, a PSCCH using an aggregation level of three may include a first resource unit in a first sub-channel (shown as sub-channel 0) of the sidelink resource pool, a second resource unit in a second sub-channel (shown as sub-channel 1), and a third resource unit in a third sub-channel (shown as sub-channel 2). In some aspects, aggregation of the single resource unit repeated in the multiple sub-channels may begin from a sub-channel associated with a lowest sub-channel index (e.g., the sub-channel that is a frequency domain resource allocation reference in first stage SCI).

In some aspects, the aggregation level used for a PSCCH carrying SCI may not be greater than a quantity of sub-channels used for a PSSCH associated with the SCI. That is, the PSCCH may be within a frequency domain resource allocation for the PSSCH.

In some aspects, the aggregation level used for a PSCCH carrying SCI may be greater than a quantity of sub-channels used for a PSSCH associated with the SCI. That is, the PSCCH may not be confined within a frequency domain resource allocation for the PSSCH. In this case, the aggregation level used for the PSCCH may be greater than the quantity of sub-channels used for the PSSCH by at least one sub-channel. Accordingly, the at least one sub-channel may be used only for PSCCH transmission and may be referred to as a PSCCH-only sub-channel.

In some aspects, for example in mode 1, the base station 110 may transmit, and the transmitting UE 120-1 may receive, an indication that the PSCCH-only sub-channel(s) is occupied (e.g., is reserved for PSSCH transmission). However, the base station 110 may transmit, and the transmitting UE 120-1 may receive (e.g., in first stage SCI and/or DCI (in DCI format 3_0)), information identifying an actual resource allocation (e.g., a frequency domain resource allocation) for the PSSCH. That is, the information may identify a resource allocation for the PSSCH that does not include the PSCCH-only sub-channel(s). Moreover, in mode 1, the transmitting UE 120-1 and the base station 110 may negotiate an aggregation level that is to be used for the PSCCH.

In some aspects, for example in mode 2, the transmitting UE 120-1 may transmit, and the receiving UE 120-2 may receive, an indication that the PSCCH-only sub-channel(s) is reserved (e.g., the transmitting UE 120-1 may reserve the PSCCH-only sub-channel(s)). For example, the transmitting UE 120-1 may transmit first stage SCI indicating that the PSCCH-only sub-channel(s) is reserved. However, the transmitting UE 120-1 may transmit (e.g., in second stage SCI), and the receiving UE 120-2 may receive, information identifying an actual resource allocation (e.g., a frequency domain resource allocation) for the PSSCH. That is, the information may identify a resource allocation for the PSSCH that does not include the PSCCH-only sub-channel(s). In some aspects, the first stage SCI indicating that the PSCCH-only sub-channel(s) is reserved may include a field (e.g., a second SCI format indicator field) that indicates where (e.g., where in frequency) the second stage SCI is mapped within the actual resource allocation for the PSSCH.

In some aspects, the transmitting UE 120-1 may map the PSCCH to resources in the multiple sub-channels according to an aggregation level. In some aspects, the receiving UE 120-2 may perform blind decoding (e.g., including channel estimation) for the PSCCH according to each aggregation level (e.g., each aggregation level that is configured for the receiving UE 120-2). For example, for an aggregation level of one, the receiving UE 120-2 may perform blind decoding in a first sub-channel; for an aggregation level of two, the receiving UE 120-2 may perform blind decoding in a first sub-channel and a second sub-channel; and so forth. The receiving UE 120-2 may perform the blind decoding, for each aggregation level, with respect to different combinations of sub-channels (e.g., contiguous sub-channels) of the sidelink resource pool. For example, if the sidelink resource pool includes ten sub-channels, then there is one PSCCH candidate for an aggregation level of ten, there are three PSCCH candidates for an aggregation level of eight, and so forth.

In some aspects, the receiving UE 120-2 may perform blind decoding for the PSCCH within a search space. In some aspects, a search space may indicate one or more aggregation levels that are to be used for blind decoding. Moreover, a search space may be associated with a particular sub-channel from which aggregation is to begin. For example, a search space may indicate that blind decoding is to be performed only for an aggregation level of four for sub-channel indices 0, 4, and 8, and so forth.

Using a single resource unit that is repeated in multiple sub-channels for transmitting SCI may be suitable when the PSCCH and/or the PSSCH are relatively large. For example, in some cases, the PSCCH may be 50% or more of the size of a sub-channel in the frequency domain and/or the PSSCH may span multiple sub-channels (e.g., ten or more sub-channels).

Figure 7D:
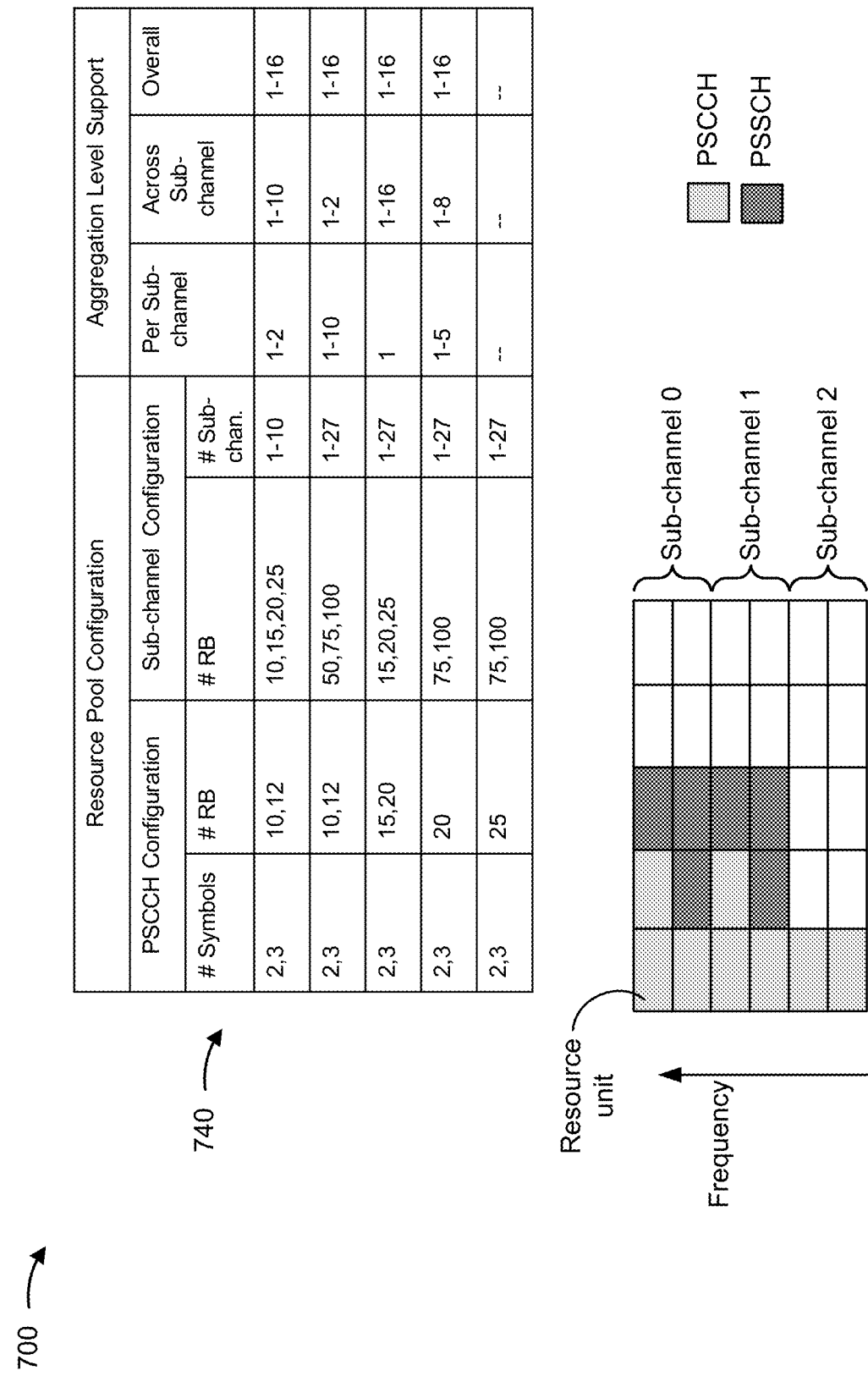

FIG. 7D shows an example of resource aggregation within and across sub-channels of the sidelink resource pool. As shown in FIG. 7D, the resources for transmitting a PSCCH (e.g., carrying first stage SCI) are in multiple sub-channels of the sidelink resource pool. For example, the resources may include one or more resource units that are repeated across multiple sub-channels.

In this case, the resources for transmitting the PSCCH may include resources in each of the multiple sub-channels. In some aspects, the resources may include one or more resources (e.g., one or more resource units) in a sub-channel, of the multiple sub-channels, as described above in connection with FIG. 7B. For example, the resources may be in the sub-channel according to a per-sub-channel aggregation level or resource aggregation configuration ($AL_{per-sub}$). In some aspects, the resources may be repeated in multiple sub-channels according to an aggregation level across sub-channels ($AL_{across-sub}$), as described above in connection with FIG. 7C. Thus, an overall aggregation level for transmitting the PSCCH may be a combination of $AL_{per-sub}$ and $AL_{across-sub}$ (e.g., a product of $AL_{per-sub}$ and $AL_{across-sub}$).

In some aspects, a sub-channel (e.g., a last sub-channel, by sub-channel index), of the multiple sub-channels, may include a different per-sub-channel aggregation level or resource aggregation configuration ($AL_{per-sub}$) than the other sub-channels of the multiple sub-channels. For example, the sub-channel may include a different quantity of resource units than the other sub-channels. This may occur when the overall aggregation level cannot be evenly divided among the multiple sub-channels (e.g., the overall aggregation level is not a product of $AL_{per-sub}$ and $AL_{across-sub}$).

In some aspects, an overall aggregation level may support different combinations of $AL_{per-sub}$ and $AL_{across-sub}$. For example, an overall aggregation level of eight may support $AL_{per-sub}=2$ and $AL_{across-sub}=4$; $AL_{per-sub}=4$ and $AL_{across-sub}=2$; or $AL_{per-sub}=3$ and $AL_{across-sub}=2$, with an additional two resource units in an additional sub-channel (as shown in FIG. 7D). In some aspects, the transmitting UE 120-1 and/or the receiving UE 120-2 may be configured to support one or more possible combinations of $AL_{per-sub}$ and $AL_{across-sub}$ for a particular overall aggregation level.

In some aspects, a per-sub-channel aggregation level or resource aggregation configuration ($AL_{per-sub}$) and/or an aggregation level across sub-channels ($AL_{across-sub}$) may be based at least in part on a sidelink resource pool configuration. For example, table 740 shows aggregation level support for various sidelink resource pool configurations. In some aspects, the aggregation level support for the various sidelink resource pool configurations may be configured (e.g., statically or semi-statically). For example, the base station 110 may transmit, and a UE 120 may receive, an upper-layer configuration for the aggregation level support, such as via a system information block, an RRC message, and/or the like.

In some aspects, a per-sub-channel aggregation level or resource aggregation configuration ($AL_{per-sub}$) may be according to an aggregation level pattern, as described above. In some aspects, each sub-channel of the multiple sub-channels may use a respective aggregation level pattern. In some aspects, an aggregation level pattern may be based at least in part on a sidelink resource pool configuration and/or an aggregation level support configuration for a sidelink resource pool configuration. In some aspects, an aggregation level pattern may indicate that a PSCCH is to be mapped to resources of a sub-channel first in a frequency domain and then in a time domain (e.g., to accommodate a processing time for the PSCCH).

In some aspects, the transmitting UE 120-1 may map the PSCCH to resources in the multiple sub-channels according to an overall aggregation level. For example, the transmitting UE 120-1 may map the PSCCH to resources in a sub-channel according to a per-sub-channel aggregation level or resource aggregation configuration ($AL_{per\text{-}sub}$), and map the PSCCH to resources in multiple sub-channels according to an aggregation level across sub-channels ($AL_{across\text{-}sub}$).

In some aspects, the receiving UE 120-2 may perform blind decoding (e.g., including channel estimation) for the PSCCH according to each per-sub-channel and across sub-channel combination of each overall aggregation level (e.g., each overall aggregation level that is configured for the receiving UE 120-2). For example, the receiving UE 120-2 may perform blind decoding for an aggregation level of one (e.g., $AL_{per\text{-}sub}=1$ and $AL_{across\text{-}sub}=1$); perform blind decoding for the combination $AL_{per\text{-}sub}=1$ and $AL_{across\text{-}sub}=2$; perform blind decoding for the combination $AL_{per\text{-}sub}=2$ and $AL_{across\text{-}sub}=2$; perform blind decoding for the combination $AL_{per\text{-}sub}=2$ and $AL_{across\text{-}sub}=3$, with an additional two resource units in an additional sub-channel; perform blind decoding for the combination $AL_{per\text{-}sub}=2$ and $AL_{across\text{-}sub}=4$; and so forth.

In some aspects, the receiving UE 120-2 may perform blind decoding for the PSCCH within a search space. In some aspects, a search space may indicate one or more per-sub-channel and across sub-channel combinations that are to be used for blind decoding using a particular aggregation level. Moreover, a search space may be associated with a particular sub-channel from which aggregation is to begin. For example, a search space may indicate that blind decoding is to be performed for an aggregation level of four using only $AL_{per\text{-}sub}=1$ and $AL_{across\text{-}sub}=4$ for sub-channel indices 0, 4, and 8, and so forth.

Figure 7E:
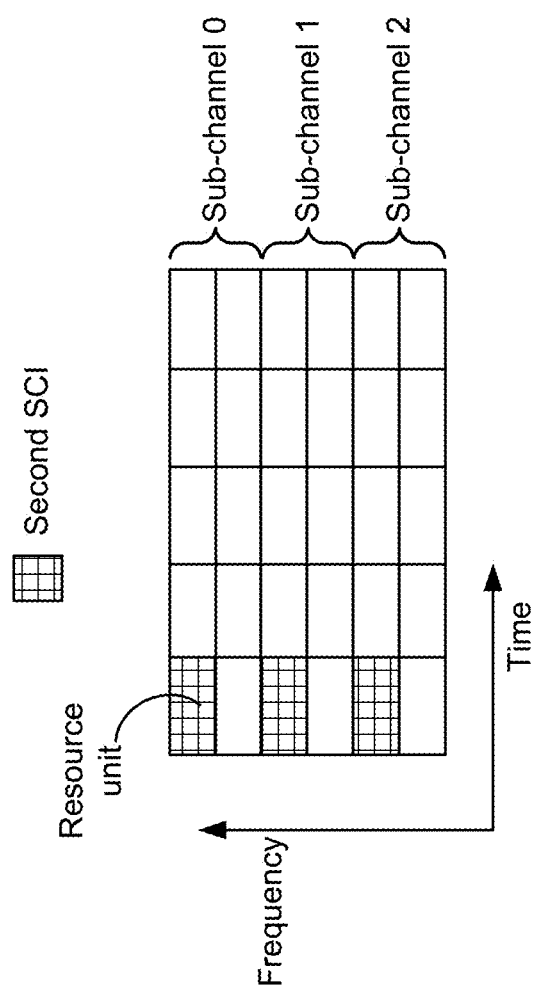

FIG. 7E shows an example of resource aggregation for a PSSCH. As described above, second stage SCI may be mapped to a PSSCH. For example, the second stage SCI may be mapped to the PSSCH first in a frequency domain and then in a time domain. In some cases, first stage SCI may indicate a beta offset value that indicates a quantity of resources of the PSSCH that is to be used for the second stage SCI.

In some aspects, an aggregation level or a resource aggregation configuration for the second stage SCI may be based at least in part on an aggregation level or a resource aggregation configuration for a PSCCH (e.g., carrying the first stage SCI) and/or an MCS for the PSSCH (e.g., because reliability and/or channel conditions in the PSSCH for the second stage SCI and a PSSCH communication may be similar). In this way, a beta offset field in the first stage SCI may be repurposed (e.g., to indicate information other than a beta offset, such as information relating to resource selection and/or scheduling in mode 1).

In some aspects, an aggregation level or resource aggregation configuration for transmitting the SCI in the PSSCH may use a single sub-channel of the sidelink resource pool, as described above in FIG. 7B. In some aspects, an aggregation level for transmitting the SCI in the PSSCH may use a single resource unit repeated in multiple sub-channels of the sidelink resource pool (as shown in FIG. 7E for an aggregation level of three), as described above in FIG. 7C. In some aspects, an overall aggregation level for transmitting the SCI in the PSSCH may use a combination of a per-sub-channel aggregation level or resource aggregation configuration and an aggregation level across sub-channels, as described above in FIG. 7D. Using aggregation across sub-channels for second stage SCI may improve a robustness of the second stage SCI relative to interference.

As indicated above, FIGS. 7A-7E are provided as example. Other examples may differ from what is described with respect to FIGS. 7A-7E.

Figure 8:
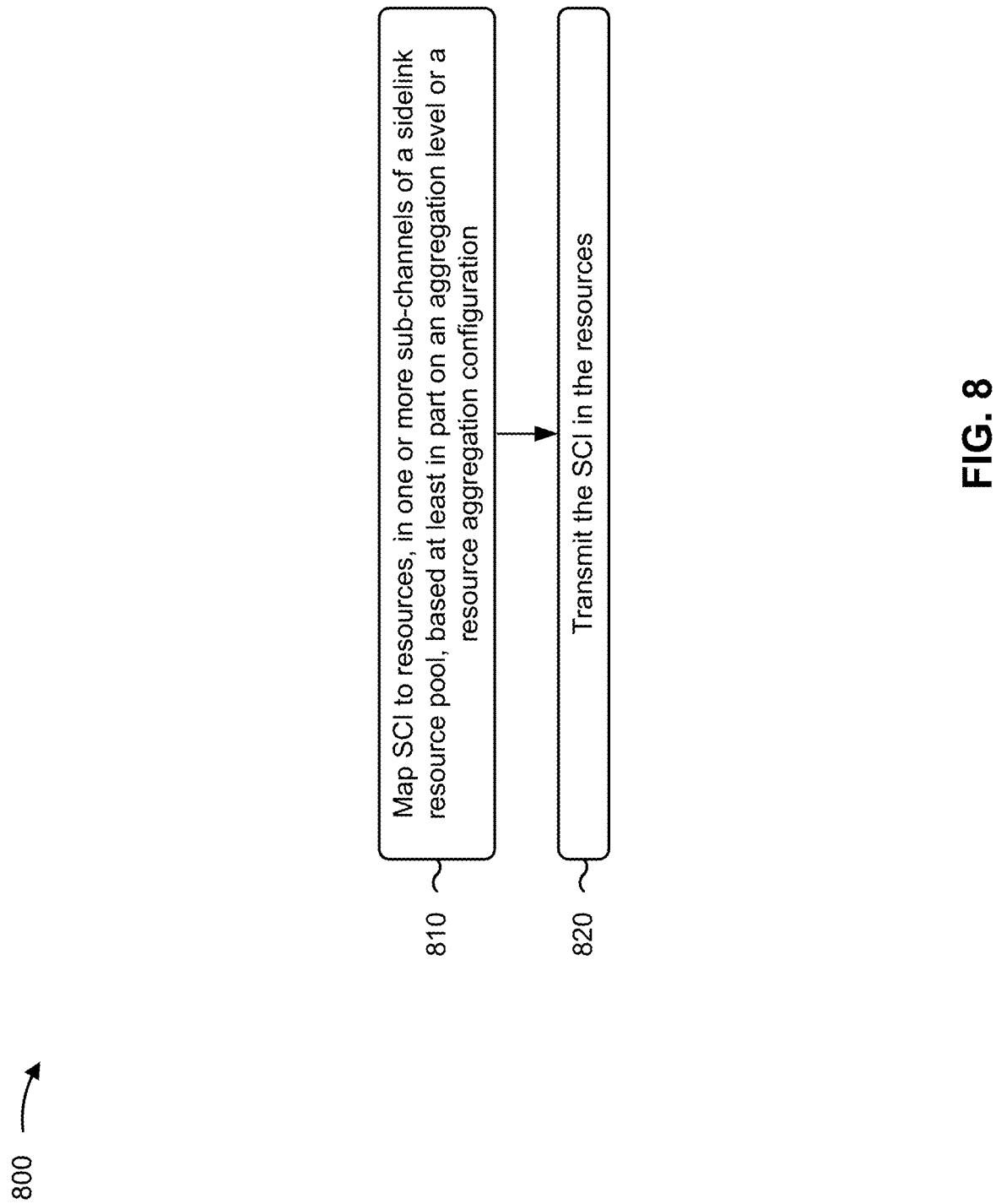
FIGS. 8 and 9 are diagrams illustrating example processes associated with aggregation for sidelink communication, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with aggregation for sidelink communication.

As shown in FIG. 8, in some aspects, process 800 may include mapping SCI to resources, in one or more sub-channels of a sidelink resource pool, based at least in part on an aggregation level or a resource aggregation configuration (block 810). For example, the UE (e.g., using receive processor 258, transmit processor 264, controller/processor 280, memory 282, and/or the like) may map SCI to resources, in one or more sub-channels of a sidelink resource pool, based at least in part on an aggregation level or a resource aggregation configuration, as described above.

As further shown in FIG. 8, in some aspects, process 800 may include transmitting the SCI in the resources (block 820). For example, the UE (e.g., using controller/processor 280, transmit processor 264, TX MIMO processor 266, MOD 254, antenna 252, and/or the like) may transmit the SCI in the resources, as described above.

Process 800 may include additional aspects, such as any single aspect or any combination of aspects described below and/or in connection with one or more other processes described elsewhere herein.

In a first aspect, the resources are in a single sub-channel of the one or more sub-channels.

In a second aspect, alone or in combination with the first aspect, the resources are located in the single sub-channel according to an aggregation level pattern.

In a third aspect, alone or in combination with one or more of the first and second aspects, the resource aggregation configuration identifies a quantity of resource blocks and a quantity of symbols associated with the resources.

In a fourth aspect, alone or in combination with one or more of the first through third aspects, the resources include a single resource unit repeated in multiple sub-channels of the one or more sub-channels.

In a fifth aspect, alone or in combination with one or more of the first through fourth aspects, the single resource unit repeated in the multiple sub-channels is associated with a same resource location in the multiple sub-channels.

In a sixth aspect, alone or in combination with one or more of the first through fifth aspects, the aggregation level is not greater than a quantity of sub-channels used for a PSSCH communication associated with the SCI.

In a seventh aspect, alone or in combination with one or more of the first through sixth aspects, process 800 includes determining the aggregation level.

In an eighth aspect, alone or in combination with one or more of the first through seventh aspects, process 800 includes receiving information that identifies the aggregation level.

In a ninth aspect, alone or in combination with one or more of the first through eighth aspects, the aggregation level is greater than a quantity of sub-channels, used for a PSSCH communication associated with the SCI, by at least one sub-channel.

In a tenth aspect, alone or in combination with one or more of the first through ninth aspects, process 800 includes receiving an indication that the at least one sub-channel is reserved, and receiving information identifying a resource allocation for the PSSCH communication that does not include the at least one sub-channel.

In an eleventh aspect, alone or in combination with one or more of the first through tenth aspects, process 800 includes transmitting an indication that the at least one sub-channel is reserved, and transmitting information identifying a resource allocation for the PSSCH communication that does not include the at least one sub-channel.

In a twelfth aspect, alone or in combination with one or more of the first through eleventh aspects, the resources include one or more resource units in multiple sub-channels of the one or more sub-channels.

In a thirteenth aspect, alone or in combination with one or more of the first through twelfth aspects, the resources are located in the multiple sub-channels according to an aggregation level pattern, and the aggregation level pattern is based at least in part on a configuration for the sidelink resource pool.

In a fourteenth aspect, alone or in combination with one or more of the first through thirteenth aspects, blind decoding for the SCI is to be performed for a plurality of aggregation levels or a plurality of resource aggregation configurations in each of the one or more sub-channels.

In a fifteenth aspect, alone or in combination with one or more of the first through fourteenth aspects, blind decoding for the SCI is to be performed in one or more search spaces for the one or more sub-channels.

In a sixteenth aspect, alone or in combination with one or more of the first through fifteenth aspects, the SCI is a first SCI transmitted in a PSCCH or a second SCI transmitted in a PSSCH.

In a seventeenth aspect, alone or in combination with one or more of the first through sixteenth aspects, the first SCI is associated with a first aggregation level, and the second SCI is associated with a second aggregation level that is based at least in part on at least one of the first aggregation level or an MCS for the PS SCH.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
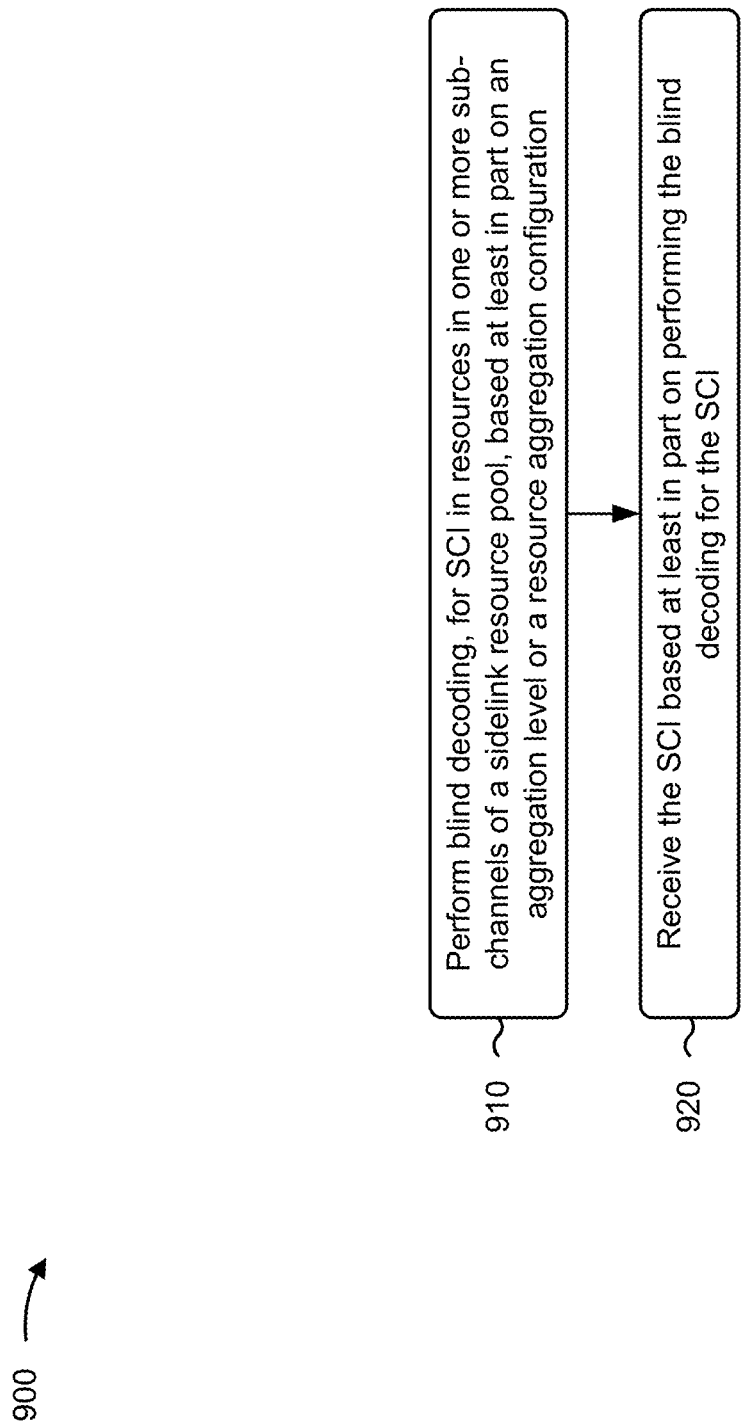

FIG. 9 is a diagram illustrating an example process 900 performed, for example, by a UE, in accordance with the present disclosure. Example process 900 is an example where the UE (e.g., UE 120 and/or the like) performs operations associated with aggregation for sidelink communication.

As shown in FIG. 9, in some aspects, process 900 may include performing blind decoding, for SCI in resources in one or more sub-channels of a sidelink resource pool, based at least in part on an aggregation level or a resource aggregation configuration (block 910). For example, the UE (e.g., using antenna 252, DEMOD 254, MIMO detector 256, receive processor 258, controller/processor 280, and/or the like) may perform blind decoding, for SCI in resources in one or more sub-channels of a sidelink resource pool, based at least in part on an aggregation level or a resource aggregation configuration, as described above.

As further shown in FIG. 9, in some aspects, process 900 may include receiving the SCI based at least in part on performing the blind decoding for the SCI (block 920). For example, the UE (e.g., using antenna 252, DEMOD 254, MIMO detector 256, receive processor 258, controller/processor 280, and/or the like) may receive the SCI based at least in part on performing the blind decoding for the SCI, as described above.

Process 900 may include additional aspects, such as any single aspect or any combination of aspects described below and/or in connection with one or more other processes described elsewhere herein.

In a first aspect, the resources are in a single sub-channel of the one or more sub-channels.

In a second aspect, alone or in combination with the first aspect, the resources are located in the single sub-channel according to an aggregation level pattern.

In a third aspect, alone or in combination with one or more of the first and second aspects, the resource aggregation configuration identifies a quantity of resource blocks and a quantity of symbols associated with the resources.

In a fourth aspect, alone or in combination with one or more of the first through third aspects, the resources include a single resource unit repeated in multiple sub-channels of the one or more sub-channels.

In a fifth aspect, alone or in combination with one or more of the first through fourth aspects, the single resource unit repeated in the multiple sub-channels is associated with a same resource location in the multiple sub-channels.

In a sixth aspect, alone or in combination with one or more of the first through fifth aspects, the aggregation level is not greater than a quantity of sub-channels used for a PSSCH communication associated with the SCI.

In a seventh aspect, alone or in combination with one or more of the first through sixth aspects, process 900 includes receiving information that identifies the aggregation level.

In an eighth aspect, alone or in combination with one or more of the first through seventh aspects, the aggregation level is greater than a quantity of sub-channels, used for a PSSCH communication associated with the SCI, by at least one sub-channel.

In a ninth aspect, alone or in combination with one or more of the first through eighth aspects, process 900 includes receiving an indication that the at least one sub-channel is reserved, and receiving information identifying a resource allocation for the PSSCH communication that does not include the at least one sub-channel.

In a tenth aspect, alone or in combination with one or more of the first through ninth aspects, the resources include one or more resource units in multiple sub-channels of the one or more sub-channels.

In an eleventh aspect, alone or in combination with one or more of the first through tenth aspects, the resources are located in the multiple sub-channels according to an aggregation level pattern, and the aggregation level pattern is based at least in part on a configuration for the sidelink resource pool.

In a twelfth aspect, alone or in combination with one or more of the first through eleventh aspects, the blind decoding for the SCI is performed for a plurality of aggregation levels or a plurality of resource aggregation configurations in each of the one or more sub-channels.

In a thirteenth aspect, alone or in combination with one or more of the first through twelfth aspects, the blind decoding for the SCI is performed in one or more search spaces for the one or more sub-channels.

In a fourteenth aspect, alone or in combination with one or more of the first through thirteenth aspects, the SCI is a first SCI received in a PSCCH or a second SCI received in a PSSCH.

In a fifteenth aspect, alone or in combination with one or more of the first through fourteenth aspects, the first SCI is associated with a first aggregation level, and the second SCI is associated with a second aggregation level that is based at least in part on at least one of the first aggregation level or an MCS for the PSSCH.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: performing blind decoding, for sidelink control information (SCI) in resources in one or more sub-channels of a sidelink resource pool, based at least in part on an aggregation level or a resource aggregation configuration; and receiving the SCI based at least in part on performing the blind decoding for the SCI.

Aspect 2: The method of Aspect 1, wherein the resources are in a single sub-channel of the one or more sub-channels.

Aspect 3: The method of Aspect 2, wherein the resources are located in the single sub-channel according to an aggregation level pattern.

Aspect 4: The method of any of Aspects 1-3, wherein the resource aggregation configuration identifies a quantity of resource blocks and a quantity of symbols associated with the resources.

Aspect 5: The method of any of Aspects 1 or 4, wherein the resources include a single resource unit repeated in multiple sub-channels of the one or more sub-channels.

Aspect 6: The method of Aspect 5, wherein the single resource unit repeated in the multiple sub-channels is associated with a same resource location in the multiple sub-channels.

Aspect 7: The method of any of Aspects 1-6, wherein the aggregation level is not greater than a quantity of sub-channels used for a physical sidelink shared channel communication associated with the SCI.

Aspect 8: The method of any of Aspects 1-7, further comprising receiving information that identifies the aggregation level.

Aspect 9: The method of any of Aspects 1-6 or 8, wherein the aggregation level is greater than a quantity of sub-channels, used for a physical sidelink shared channel (PSSCH) communication associated with the SCI, by at least one sub-channel.

Aspect 10: The method of Aspect 9, further comprising: receiving an indication that the at least one sub-channel is reserved; and receiving information identifying a resource allocation for the PSSCH communication that does not include the at least one sub-channel.

Aspect 11: The method of Aspect 1, wherein the resources include one or more resource units in multiple sub-channels of the one or more sub-channels.

Aspect 12: The method of Aspect 11, wherein the resources are located in the multiple sub-channels according to an aggregation level pattern, and wherein the aggregation level pattern is based at least in part on a configuration for the sidelink resource pool.

Aspect 13: The method of any of Aspects 1-12, wherein the blind decoding for the SCI is performed for a plurality of aggregation levels or a plurality of resource aggregation configurations in each of the one or more sub-channels.

Aspect 14: The method of any of Aspects 1-13, wherein the blind decoding for the SCI is performed in one or more search spaces for the one or more sub-channels.

Aspect 15: The method of any of Aspects 1-14, wherein the SCI is a first SCI received in a physical sidelink control channel or a second SCI received in a physical sidelink shared channel.

Aspect 16: The method of Aspect 15, wherein the first SCI is associated with a first aggregation level, and the second SCI is associated with a second aggregation level that is based at least in part on at least one of the first aggregation level or a modulation and coding scheme for the physical sidelink shared channel.

Aspect 17: A method of wireless communication performed by a user equipment (UE), comprising: mapping sidelink control information (SCI) to resources, in one or more sub-channels of a sidelink resource pool, based at least in part on an aggregation level or a resource aggregation configuration; and transmitting the SCI in the resources.

Aspect 18: The method of Aspect 17, wherein the resources are in a single sub-channel of the one or more sub-channels.

Aspect 19: The method of Aspect 18, wherein the resources are located in the single sub-channel according to an aggregation level pattern.

Aspect 20: The method of any of Aspects 17-19, wherein the resource aggregation configuration identifies a quantity of resource blocks and a quantity of symbols associated with the resources.

Aspect 21: The method of any of Aspects 17 or 20, wherein the resources include a single resource unit repeated in multiple sub-channels of the one or more sub-channels.

Aspect 22: The method of Aspect 21, wherein the single resource unit repeated in the multiple sub-channels is associated with a same resource location in the multiple sub-channels.

Aspect 23: The method of any of Aspects 17-22, wherein the aggregation level is not greater than a quantity of sub-channels used for a physical sidelink shared channel communication associated with the SCI.

Aspect 24: The method of any of Aspects 17-23, further comprising determining the aggregation level.

Aspect 25: The method of any of Aspects 17-24, further comprising receiving information that identifies the aggregation level.

Aspect 26: The method of any of Aspects 17-22 or 24-25, wherein the aggregation level is greater than a quantity of sub-channels, used for a physical sidelink shared channel (PSSCH) communication associated with the SCI, by at least one sub-channel.

Aspect 27: The method of Aspect 26, further comprising: receiving an indication that the at least one sub-channel is reserved; and receiving information identifying a resource allocation for the PSSCH communication that does not include the at least one sub-channel.

Aspect 28: The method of any of Aspects 26-27, further comprising: transmitting an indication that the at least one sub-channel is reserved; and transmitting information identifying a resource allocation for the PSSCH communication that does not include the at least one sub-channel.

Aspect 29: The method of Aspect 17, wherein the resources include one or more resource units in multiple sub-channels of the one or more sub-channels.

Aspect 30: The method of Aspect 29, wherein the resources are located in the multiple sub-channels according to an aggregation level pattern, and wherein the aggregation level pattern is based at least in part on a configuration for the sidelink resource pool.

Aspect 31: The method of any of Aspects 17-30, wherein blind decoding for the SCI is to be performed for a plurality of aggregation levels or a plurality of resource aggregation configurations in each of the one or more sub-channels.

Aspect 32: The method of any of Aspects 17-31, wherein blind decoding for the SCI is to be performed in one or more search spaces for the one or more sub-channels.

Aspect 33: The method of any of Aspects 17-32, wherein the SCI is a first SCI transmitted in a physical sidelink control channel or a second SCI transmitted in a physical sidelink shared channel.

Aspect 34: The method of Aspect 33, wherein the first SCI is associated with a first aggregation level, and the second SCI is associated with a second aggregation level that is based at least in part on at least one of the first aggregation level or a modulation and coding scheme for the physical sidelink shared channel.

Aspect 35: An apparatus for wireless communication at a device, comprising a processor; memory coupled with the processor; and instructions stored in the memory and executable by the processor to cause the apparatus to perform the method of one or more of Aspects 1-16.

Aspect 36: A device for wireless communication, comprising a memory and one or more processors coupled to the memory, the one or more processors configured to perform the method of one or more of Aspects 1-16.

Aspect 37: An apparatus for wireless communication, comprising at least one means for performing the method of one or more of Aspects 1-16.

Aspect 38: A non-transitory computer-readable medium storing code for wireless communication, the code comprising instructions executable by a processor to perform the method of one or more of Aspects 1-16.

Aspect 39: A non-transitory computer-readable medium storing a set of instructions for wireless communication, the set of instructions comprising one or more instructions that, when executed by one or more processors of a device, cause the device to perform the method of one or more of Aspects 1-16.

Aspect 40: An apparatus for wireless communication at a device, comprising a processor; memory coupled with the processor; and instructions stored in the memory and executable by the processor to cause the apparatus to perform the method of one or more of Aspects 17-34.

Aspect 41: A device for wireless communication, comprising a memory and one or more processors coupled to the memory, the one or more processors configured to perform the method of one or more of Aspects 17-34.

Aspect 42: An apparatus for wireless communication, comprising at least one means for performing the method of one or more of Aspects 17-34.

Aspect 43: A non-transitory computer-readable medium storing code for wireless communication, the code comprising instructions executable by a processor to perform the method of one or more of Aspects 17-34.

Aspect 44: A non-transitory computer-readable medium storing a set of instructions for wireless communication, the set of instructions comprising one or more instructions that, when executed by one or more processors of a device, cause the device to perform the method of one or more of Aspects 17-34.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
perform blind decoding, for sidelink control information (SCI) in resources in one or more sub-channels of a sidelink resource pool, based at least in part on an aggregation level or a resource aggregation configuration; and
receive the SCI based at least in part on performing the blind decoding for the SCI.

2. The UE of claim 1, wherein the resources are in a single sub-channel of the one or more sub-channels.

3. The UE of claim 2, wherein the resources are located in the single sub-channel according to an aggregation level pattern.

4. The UE of claim 1, wherein the resource aggregation configuration identifies a quantity of resource blocks and a quantity of symbols associated with the resources.

5. The UE of claim 1, wherein the resources include a single resource unit repeated in multiple sub-channels of the one or more sub-channels, and
wherein the single resource unit repeated in the multiple sub-channels is associated with a same resource location in the multiple sub-channels.

6. The UE of claim 1, wherein the aggregation level is not greater than a quantity of sub-channels used for a physical sidelink shared channel communication associated with the SCI.

7. The UE of claim 1, wherein the one or more processors are further configured to receive information that identifies the aggregation level.

8. The UE of claim 1, wherein the aggregation level is greater than a quantity of sub-channels, used for a physical sidelink shared channel (PSSCH) communication associated with the SCI, by at least one sub-channel.

9. The UE of claim 8, wherein the one or more processors are further configured to:
receive an indication that the at least one sub-channel is reserved; and
receive information identifying a resource allocation for the PSSCH communication that does not include the at least one sub-channel.

10. The UE of claim 1, wherein the resources include one or more resource units in multiple sub-channels of the one or more sub-channels.

11. The UE of claim 10, wherein the resources are located in the multiple sub-channels according to an aggregation level pattern, and
wherein the aggregation level pattern is based at least in part on a configuration for the sidelink resource pool.

12. The UE of claim 1, wherein the blind decoding for the SCI is performed for a plurality of aggregation levels or a plurality of resource aggregation configurations in each of the one or more sub-channels.

13. The UE of claim 1, wherein the blind decoding for the SCI is performed in one or more search spaces for the one or more sub-channels.

14. The UE of claim 1, wherein the SCI is a first SCI received in a physical sidelink control channel or a second SCI received in a physical sidelink shared channel.

15. The UE of claim 14, wherein the first SCI is associated with a first aggregation level, and the second SCI is associated with a second aggregation level that is based at least in part on at least one of the first aggregation level or a modulation and coding scheme for the physical sidelink shared channel.

16. A UE for wireless communication, comprising:
a memory; and
one or more processors, coupled to the memory, configured to:
map sidelink control information (SCI) to resources, in one or more sub-channels of a sidelink resource pool, based at least in part on an aggregation level or a resource aggregation configuration; and
transmit the SCI in the resources.

17. The UE of claim 16, wherein the resources are in a single sub-channel of the one or more sub-channels.

18. The UE of claim 17, wherein the resources are located in the single sub-channel according to an aggregation level pattern.

19. The UE of claim 16, wherein the resource aggregation configuration identifies a quantity of resource blocks and a quantity of symbols associated with the resources.

20. The UE of claim 16, wherein the resources include a single resource unit repeated in multiple sub-channels of the one or more sub-channels, and
wherein the single resource unit repeated in the multiple sub-channels is associated with a same resource location in the multiple sub-channels.

21. The UE of claim 16, wherein the aggregation level is not greater than a quantity of sub-channels used for a physical sidelink shared channel communication associated with the SCI.

22. The UE of claim 16, wherein the one or more processors are further configured to receive information that identifies the aggregation level.

23. The UE of claim 16, wherein the aggregation level is greater than a quantity of sub-channels, used for a physical sidelink shared channel (PSSCH) communication associated with the SCI, by at least one sub-channel.

24. The UE of claim 23, wherein the one or more processors are further configured to:
receive or transmit an indication that the at least one sub-channel is reserved; and
receive or transmit information identifying a resource allocation for the PSSCH communication that does not include the at least one sub-channel.

25. The UE of claim 16, wherein the resources include one or more resource units in multiple sub-channels of the one or more sub-channels.

26. The UE of claim 25, wherein the resources are located in the multiple sub-channels according to an aggregation level pattern, and
wherein the aggregation level pattern is based at least in part on a configuration for the sidelink resource pool.

27. The UE of claim 16, wherein the SCI is a first SCI transmitted in a physical sidelink control channel or a second SCI transmitted in a physical sidelink shared channel.

28. The UE of claim 27, wherein the first SCI is associated with a first aggregation level, and the second SCI is associated with a second aggregation level that is based at least in part on at least one of the first aggregation level or a modulation and coding scheme for the physical sidelink shared channel.

29. A method of wireless communication performed by a user equipment (UE), comprising:
performing blind decoding, for sidelink control information (SCI) in resources in one or more sub-channels of a sidelink resource pool, based at least in part on an aggregation level or a resource aggregation configuration; and receiving the SCI based at least in part on performing the blind decoding for the SCI.

30. A method of wireless communication performed by a user equipment (UE), comprising:

mapping sidelink control information (SCI) to resources, in one or more sub-channels of a sidelink resource pool, based at least in part on an aggregation level or a resource aggregation configuration; and transmitting the SCI in the resources.

* * * * *